June 23, 1959  W. P. EWALD  2,891,444
STEREO TABLE VIEWER
Filed Oct. 24, 1955  3 Sheets-Sheet 1

WILLIAM P. EWALD
INVENTOR.

BY

ATTORNEYS

June 23, 1959 W. P. EWALD 2,891,444
STEREO TABLE VIEWER

Filed Oct. 24, 1955 3 Sheets-Sheet 3

WILLIAM P. EWALD
INVENTOR.

BY

ATTORNEYS

United States Patent Office 2,891,444
Patented June 23, 1959

2,891,444

STEREO TABLE VIEWER

William P. Ewald, Rochester, N.Y., assignor to Eastman Kodak Company, Rochester, N.Y., a corporation of New Jersey Application October 24, 1955, Serial No. 542,163

7 Claims. (Cl. 88—29)

This invention relates to stereo viewers, specifically to viewers in which stereo images are projected to a screen and viewed without the need for special glasses over the eyes.

The object of the invention is to provide such a viewer for use with standard stereo transparencies mounted at interocular separation; i.e., with their centers about 2½ inches apart. It is a special object of the invention to provide an optical system which permits the stereo images to be projected to a screen with sufficient magnification to form images between 3 and 10 inches wide, preferably about 5 inches wide. Such images can be viewed comfortably from a distance of about 2 feet, or for that matter, anywhere between 1 foot and 6 feet.

The present invention is a modification of prior optical systems which attempted to provide the above advantages, at least in a general way, but which did not provide the proper distribution of light for convenient viewing. The primary object of the present invention, accordingly, is to provide a proper distribution of light at the position occupied by the right and left eyes of the observer.

In a preferred embodiment of the invention, baffles are provided so that the observer will subconsciously tend to position his head somewhere in the area which provides complete stereo separation for the right and left eyes.

Figure 1:
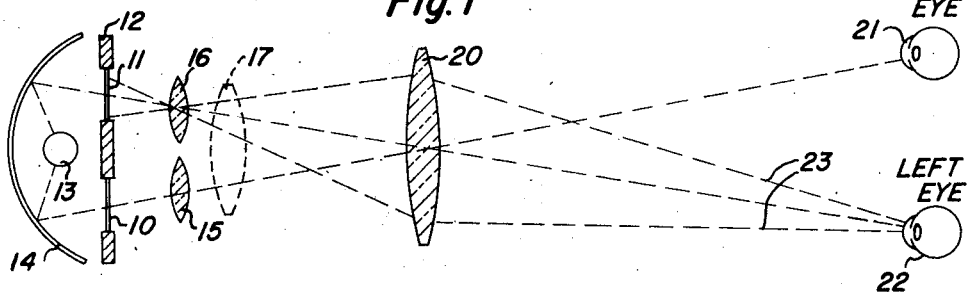
Figure 2:
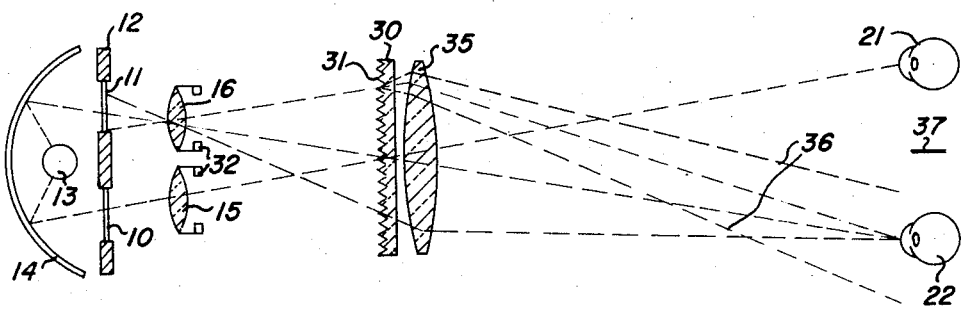
Figure 3:
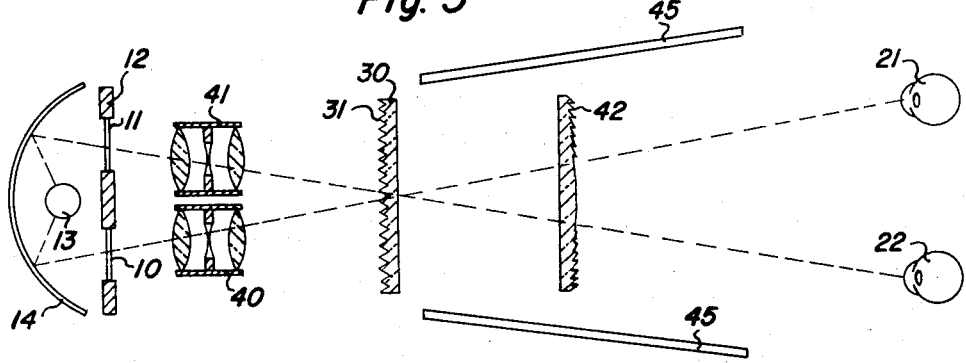
Figure 4:
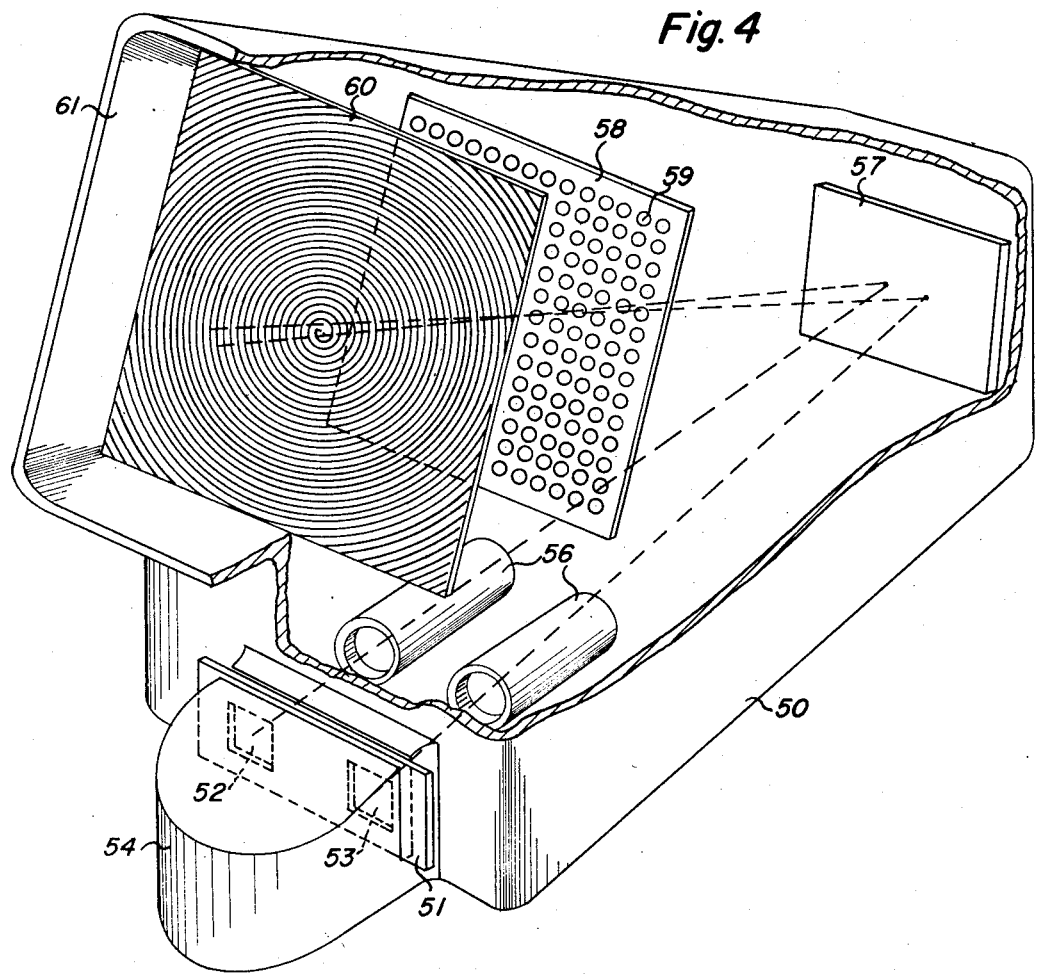
Figure 5:
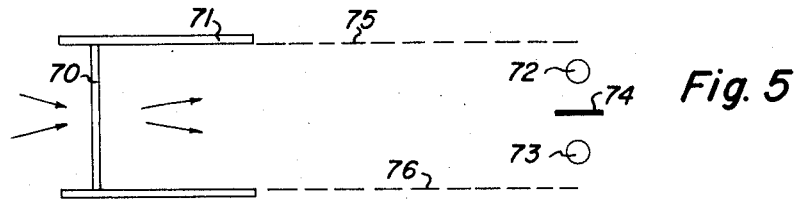
Figure 6:
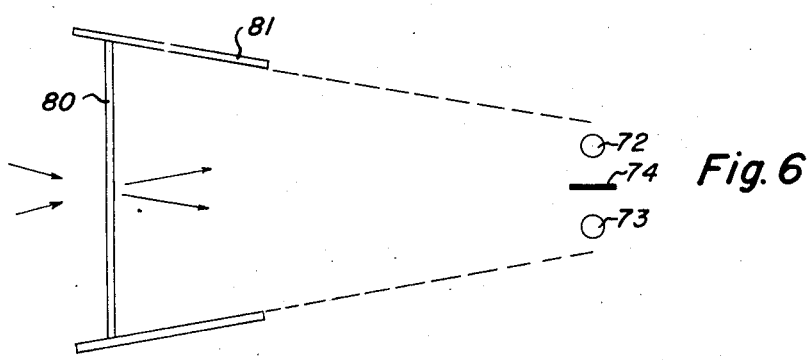
Figure 7:
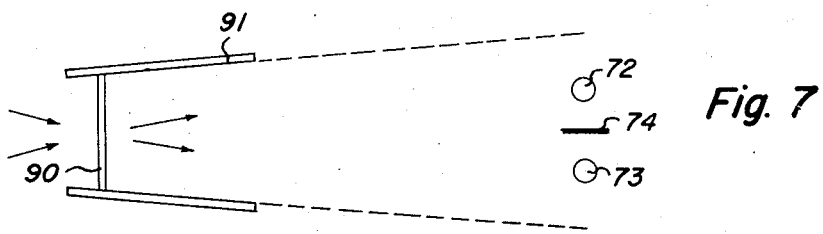
Figure 8:
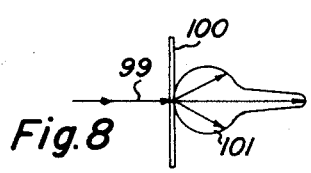
Figure 9:
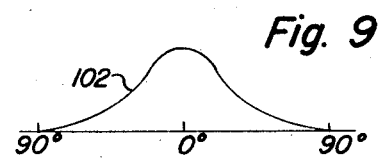
Figure 10:
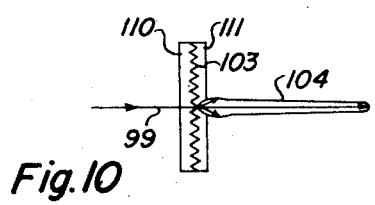

Other objects and advantages of the invention will be fully understood from the following description when read in connection with the accompanying drawings, in which:

Fig. 1 schematically illustrates the essential optical system of a number of prior viewers;

Fig. 2 similarly illustrates the essential optical system of the present invention;

Fig. 3 similarly illustrates a different embodiment of the present invention;

Fig. 4 is a perspective view partly broken away of a stereo viewer incorporating the preferred embodiment of the invention;

Figs. 5, 6 and 7 schematically illustrate various forms of the baffles for controlling the observer's position; and Figs. 8 to 11 diagrammatically illustrate the effect of controlled divergence, Fig. 10 including an immersed form of the diverging surface employed in the invention.

In Fig. 1 right and left eye transparencies 10 and 11 are mounted in a standard stereo mount 12 at interocular separation; that is, the centers of the transparencies 10 and 11 are about 2½ inches apart. Both transparencies are transilluminated by means of a lamp 13 and a reflector 14. Light from the transparencies is picked up by juxtaposed objective lenses 15 and 16 and brought to focus in an image plane at or adjacent to a field lens 20. This field lens transmits the light from the transparency 10 to the right eye 21 of the observer and the light from the transparency 11 to the left eye 22 of the observer. The field lens 20 tends to focus the objective lens 16, as indicated by the rays 23 at the left eye 22 so that if the left eye is precisely positioned, as shown, it sees a more or less uniform image in the lens 20. In some forms of the prior art the lenses 15 and 16 have their centers spaced, as shown, a distance less than the separation of the centers of the stereo transparencies. In the present case, that would be less than 2½ inches apart. The early systems did not use transparencies which were specifically 2½ inches apart since such an arrangement had not become standardized. However, Fig. 1 is shown with the transparencies 2½ inches apart and with the optical system arranged to accommodate such a mounting of the transparencies, in order to make a direct comparison of the essential features of the prior art and of the present invention.

Other forms of the prior art place the objective lenses 15 and 16 at the same separation as the transparencies and then use either a large lens as shown by broken lines at 17 or a pair of light deviating prisms, to converge the two beams so that the images are approximately superimposed at the field lens 20. The present invention could use any of the prior systems for forming the two superimposed images, but the simple system with the juxtaposed lenses separated slightly less than the transparencies appears to be quite adequate. Either in the prior systems or in the present invention mirrors may be used to fold the optical system to make the instrument more compact or to have the viewing screen located above the slide position for convenience of operation.

The prior art system described above appears to be quite efficient optically, but in practice this does not prove to be the case since the observer rarely is able to position his head with the right and left eyes exactly in the position shown and observers whose interocular separation is other than standard would find it quite impossible to position the eyes exactly as required. If the head is moved to the right or left, the images in the lens 20 fade out completely. If the head is moved forward or back, the distribution of light in each image becomes non-uniform and quite annoying. Accordingly, although such systems have been known for over 40 years, and have been investigated every few years since they were first proposed, they have had no notable commercial acceptance.

According to the present invention, as illustrated in Fig. 2, the shortcomings of the prior systems are overcome by employing a diverging screen with a divergence half angle of about 3° (between 2° and 4°) either in the form of an overcoated ground glass surface or in a modified form of the principle of the McLeod cone screen described in U.S. Patent 2,589,014, McLeod. Neither of these screens is appreciably diffusing. The prior art is not exactly as shown in Fig. 1 and the present invention is not used exactly as shown in Fig. 2, but these two figures are drawn as nearly alike as possible to emphasize an essential difference of the present invention from the prior art.

As shown in Fig. 2, the images formed by the lenses 15 and 16 are focused on a light diverging surface 31 of a transparent sheet 30. The light diverging surface 31 is shown schematically and may be either a coated ground surface as shown in Fig. 10 or a conical screen similar to that explained by McLeod but arranged for finite conjugates rather than for infinity since the present invention always works at finite conjugates. The conical embodiment is more complicated than the coated ground glass and has both disadvantages and advantages. However, it will be described first. The conical surface 31 is on the long conjugate side of the lens 15 (or 16)

whereas in the McLeod viewer the conical screen is near the focal plane on the short conjugate side of his lens. The conical half angle C of each element or cone in the surface 31 is related to the distance between the surface 31 and the lens 15 (or 16) and to the diameter of the exit pupil 32 of the lens 15 (or 16). Since the lenses 15 and 16 are substantially identical, this feature of the optical system will be described with respect to the lens 15, but applies equally well to the lens 16. If the index of refraction of the transparent sheet 30 is N then tan C approximately equals $$\frac{2L}{p}(N-1)$$

where L is the distance from the lens 15 to the surface 31 and $p$ is the diameter of the pupil 32 which acts as the entrance pupil of the system, the exit pupil being at the viewing plane. Whichever form of light diverging screen is used (conical or that illustrated in Fig. 10) the divergence half angle should be about 3°. Much less than this gives all the troubles of the prior art and much more than this interferes with the separation of the stereo images. As explained by McLeod these cone screens perform with a minimum of scattering. A diverging but completely non-diffusing screen would be ideal in the present invention and cone screens are substantially non-diffusing. The conical screen strictly according to the above formula assures each eye a uniform exit pupil, but does not assure that the exit pupils will extend all the way to the center 37 so as to be juxtaposed. This will be discussed further below.

A field lens 35 is positioned near the light diverging surface 31 to direct the light from the image to the right and left eyes 21 and 22. However, the effect of the surface 31 is to provide a controlled spreading of the light as indicated by the rays 36 so that the eye 22 may be positioned anywhere over a fairly large area at the viewing point. That is, the exit pupils are large. In fact, the low degree of diffusion and the precise light divergence by the surface 31 is such that in practice the left eye view is complete practically up to the dividing line indicated at 37. As long as the left eye receives this controlled light, it sees a substantially uniform left eye image at the conical screen 31. The uniformity is theoretically a little better with the cone screen than with the immersed screen but is quite good in both cases and the immersed screen can be made with no apparent pattern which is quite difficult to do with cone screens of these particular dimensions. That is, theoretically the immersed surface might be expected to be slightly diffusing as well as slightly diverging but in actual practice the diffusion is found to be negligible.

There is no need to go into all of the algebra involved in selecting the focal length of the objective lenses 15 and 16 and of the field lens 35. However, one or two points are of interest.

In the first place, the invention is used only with a reasonable degree of magnification. If the lenses 15 and 16 give only unit magnification, the images would be too small for proper viewing. For reasons discussed below, particularly in connection with Figs. 5 to 7, it is desirable to have sufficient magnification to give an image between 3 inches and 10 inches wide, preferably about 5 inches wide. This means that the magnification provided by the lens 15 must be between 4 and about 12, preferably about 6. This, in turn, means that the centers of the lenses 15 and 16 are about 2⅛ inches apart. For the eyes 21 and 22 to be 2½ inches apart, the field lens 35 should have a focal length slightly greater than ½ the distance between the lens 15 and the lens 35.

Even if the lenses 15 and 16 were working only at 2:1 magnification, the focal length of the lens 35 would still have to be less than ⅔ of the distance from the lens 15 to the lens 35.

However, the lens 35 does not have to be exactly at the diverging surface 31. In fact, in a preferred embodiment of the invention, it is moved closer to the eyes of the observer so that it acts partly as a field lens and partly as a magnifying lens in order to give further apparent magnification of the images on the screen 31. This is illustrated in Fig. 3 where the field lens 42 is made in the form of a Fresnel lens.

The effects at the viewing plane of the conical screen and the buried ground glass will now be compared. The divergence of the ground glass is effectively uniform over an exit pupil whose width is represented by the 3° half angle divergence. Rays from the center of the lens 16 are eventually directed toward the eye 22 with a 6° total spread (represented by the rays 36). Rays from the margins or edges of the lens 16 contribute additional divergence as does the fact that the ground glass does not have an absolutely sharp cut off at exactly 3°. There is enough such additional divergence to insure a uniformity which is effectively perfect over the useful exit pupil, practically up to the dividing line 37 without any detectable overlap of exit pupils which would appear as ghost images. One eye would see both right and left images if there were overlap. That is one reason why one should avoid the use of any diffusing surface.

The cone screen effect is not so simple and as a practical matter one depends on the imperfections in the cone screen for some of the useful effects thereof. As discussed above, the cone screen is designed to accept a certain size cone of light determined by the pupil of the lens 15 (or 16). The perfect screen would then have a divergence half angle equal to half that of the incident cone; it would just spread the cone to twice its angular diameter. In the McLeod system, that is exactly what is wanted. However, the present invention needs as large a divergence half angle as possible up to about 3° and this would not be obtained with a perfect cone screen designed to accept a cone of light less than 3° such as would come from a small aperture lens. A perfect screen designed for 3° half angle divergence but receiving a smaller cone of light would produce an annular exit pupil with a dark hole in the center. In practice, however, the tiny cones cannot be made perfect; they diverge light slightly beyond the computed divergence and they diverge light into any dark center which might otherwise occur in the exit pupil. Thus a cone screen with a measured half angle divergence of 3° corresponds to a perfect one designed to accept a somewhat smaller cone of light (say 2½°) and even when the incident cone of light is still smaller (say 1½°) it spreads light into the center of the exit pupil. Thus in practice the cone should be designed to have a conical half angle which gives a theoretical spread greater than that required to produce a cone twice the incident cone but less than that required to produce a cone with 6° total spread from incident axial rays. The flatter the cone, i.e., the greater the conical half angle, the less the divergence. Thus tan C should be between $$\frac{2L}{p}(N-1)$$

as discussed above and $20(N-1)$. In practice $$\frac{2L}{p}$$

is always greater than 20 since a lens working at a magnification between 4 and 20 would have to be larger than $f/2.5$ for the long conjugate L to be less than ten times the pupil $p$.

The cone of the incident light adds to the effective spread (and to the filling in of the center dark area) so that such a screen gives about 4° half angle at the exit pupil which corresponds to 1¼″ at a distance of 18″ from the screen.

In Fig. 3 high quality objectives are illustrated at 40 and 41 for forming the approximately superimposed stereo images on the screen 31. The lens 42 tends to bend the axis of each beam so that the eyes 21 and 22 of the observer can be farther away from the screen 31 and still receive the beams at 2½ inches separation. As far as its action as a field lens is concerned, the focal length of the Fresnel lens 42 comes even closer to the value of ½ the distance from the lens 40 to the Fresnel lens 42 than in the case illustrated in Fig. 2.

In order for the field lens 42 to act to a useful degree, both as a field lens and as a magnifying lens, the separation of the lens 42 and the screen 31 should be between 1/20 and ½ the distance of the screen 31 from the lens 40 (or 41). The use of the field lens as a magnifying lens is not all gain; it involves a compromise. Fresnel lenses are fine as field lenses but their image forming qualities are not perfect. Thus for some purposes it is better to leave the Fresnel lens as near the image plane as possible and thus to get the best definition. In other cases the definition may be acceptable with the Fresnel lens separated as shown in Fig. 3 and the resultant magnification and apparent shift of the images back toward the lenses 40 and 41 is desirable.

Also, in this preferred embodiment of the invention, baffles 45 are provided at the sides of the image plane 31 extending in the direction of the light passing through the image plane; i.e., extending toward the observer. These baffles tend to make the observer subconsciously position himself correctly for viewing the stereo images. Due to the present invention the observer has a wide range of positions which are quite satisfactory and will find so much freedom in viewing the stereo images that, without the baffles, his head may even wander outside of the wide range of proper locations. With the baffles, however, the observer will not move his head so far to the right that the eye 21 no longer sees the right hand side of the screen 31. Similarly, he will not move his head so far to the left that the left eye 22 fails to see the left side of the image screen 31. When he brings his head to any position in which the right eye sees the right hand edge of the screen 31, the left eye (being 2½ inches further over) will automatically see only the left eye image and the right eye will see only the right eye image. Similarly, as long as the left eye 22 sees the left side of the screen 31 past the last baffle 45, then the left eye will see a left eye image and the right eye will be far enough over to see only a right eye image.

In Fig. 4 a practical and commercial form of the invention is illustrated in perspective with the housing of the instrument broken away and the individual mounts for the optical elements omitted for the sake of clarity.

In Fig. 4 the viewer consists of a housing 50 with a slot near the lower front side for holding a transparency mount 51 which includes left and right eye stereo transparencies 52 and 53. The mount is turned around and turned over compared to the position in Figs. 1, 2 and 3 since a mirror 57 is included in this system, but the transparencies do not have to be transposed. A lamp in a lamp housing 54 transilluminates the transparencies 52 and 53. Juxtaposed objective lenses 56 project the light from the transparencies 52 and 53 via a front surface mirror 57 into focus in an image plane on one surface of a transparent sheet 58. This surface carries light diverging cones 59 as discussed above or is in the form of an immersed surface as shown in Fig. 10. The light then passes through a Fresnel lens 60 which acts as a combination field lens and magnifying lens. The sides 61 of the housing extending from the sides of the viewing screen 58 act as the baffles discussed above and discussed in more detail in connection with Figs. 5 to 7. This viewer is extremely easy to use. The controlled divergence screen in the image plane not only controls the stereo viewing, as discussed in detail above, but also gives a brightness to both images which is practically equal to telescopic brightness; that is, this screen not only provides the present invention, but also provides, at least to a useful degree, the features of the McLeod invention itself for each of the two images even though the screen is on the long conjugate side of the objective lens rather than on the short conjugate side, as in the McLeod system, and even though a compromise has to be made with respect to the cone angle.

Figs. 5, 6 and 7 are included to explain the arrangement of the side baffles for different sizes of screens. In the most preferred embodiment of the invention the screen 70 (which is the cone screen discussed in detail above) is made 5 inches wide, which is just twice normal interocular separation. The baffles 71 extending from the sides of the screen 70 are made parallel to each other and perpendicular to the screen 70. The right eye is indicated at 72 and the left eye is indicated at 73. All of the light passing to the right of the center line 74 (at the viewing position) represent a right eye image and all of the light to the left of this center line 74 represents a left eye image. In order for the right eye 72 to see the right side of the screen 74 the eye 72 must be inside the dotted line 75 which represents a projection of the baffle 71. Since the lines 75 and 76 are five inches apart, the right eye 72 cannot be within the line 75 without the left eye 73 being between the center line 74 and the left line 76. Similarly, the left eye 73 cannot see the left side of the screen 70 without the right eye being in the proper viewing position to receive a right eye image.

In Fig. 6 the screen 80 is somewhat wider than five inches. In this case the baffles 81 have to converge so that the projection of these baffles at the normal viewing position is still about five inches wide. This is not as good as the arrangement shown in Fig. 5 since, if the observer moves too far away from the viewer, both eyes can no longer simultaneously see the whole screen and if the observer moves too close to the viewer, it is possible for both eyes to see only a right eye image or only a left eye image. However, it still works to an acceptable degree in practice.

In Fig. 7 the screen 90 is less than five inches wide. In this case the baffles 91 have to diverge in order to accommodate five inches at the normal viewing distance. This arrangement is better than Fig. 6 since the observer can always see the whole screen with both eyes, but it is possible to get so far away from the viewer that the head can be moved to one side or the other and allow both eyes to see a single image. In both cases the vergence (convergence or divergence) of the baffles is such as to provide a total viewing area 5" wide at normal viewing distance, i.e., at about 2 feet from the image plane.

The arrangement shown in Fig. 7 has proven to be quite satisfactory and even when using a 5" screen as shown in Fig. 5, it has been found quite satisfactory to have the baffles 71 diverge slightly since psychologically the observer tends to avoid the extreme edges of the field as controlled by the baffles and to stay well inside this field. That is, he will not place his head where the right eye just barely sees the right hand side of the screen, but will move in slightly from this position. Accordingly, the baffles 71 on a 5" screen 70 can diverge very slightly and still have the same psychological effect which subconsciously causes the observer to position his head properly.

Figure 11:
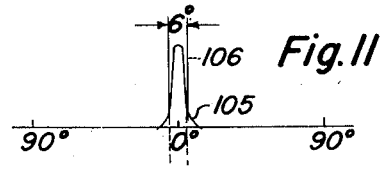

Figs. 8 and 9 illustrate the diffusion effect of ordinary ground glass i.e. a diffusing surface, as compared to that of a diverging surface employed in the present invention, the latter being illustrated in Figs. 10 and 11.

Figs. 8 and 9 are conventional charts, Fig. 8 being the polar or vector chart and Fig. 9 showing transmitted intensity plotted against angle. In Fig. 8 a beam of light 99 strikes a ground glass surface 100 and is diffused. The intensity of the diffused transmitted light is represented by the curve 101. If the ground glass were a perfect diffuser, the curve 101 would be a circle thus obeying the well-known cosine law. To the extent the curve 101 bulges in the straight through direction, the ground glass is inefficient as a diffuser. Referring to the straight through or orthogonal direction as zero angle and measuring other directions in degrees from this orthogonal, Fig. 9 shows the intensity of the transmitted light as a curve 102. The intensity is a maximum at zero angle and remains at high level out to fairly wide angles falling off to zero at 90° from the axis.

In Fig. 10 the ground surface 103 is made to have quite a different pattern of transmission as shown by curve 104, or by curve 105 in Fig. 11. The surface is not noticeably diffusing at all. It is a light diverging or spreading surface. At 3° on either side of the axis, the intensity has fallen to less than 50% of maximum. The broken lines 106 are separated by 6° and the half angle of the divergence is 3°. The term divergence is preferred (associated with the light transmission) since the angle is so small it is not diffusion in the proper sense.

The cone screen discussed in detail above has a divergence half angle of about 3°.

The screen shown in Fig. 10 consists of a sheet of glass or other transparent material 110 whose surface 103 has been uniformly ground. The surface is then coated with a layer 111 of different index of refraction from that of the glass. If the index difference is too great (as in the case of glass to air) the surface is diffusing. If the index difference is too small, there is practically no divergence. An index difference between .02 and .2 works satisfactorily. The coarseness of the grinding (at least over the usual range employed for ground glass) does not seem to have any great effect on the final divergence and lack of diffusion. The coating 111 must be more than a quarter wavelength of light thick to avoid the phenomenon described in U.S. 2,364,369 Jelley et al. which points out that such thin layers do not reduce the diffusion appreciably. However, thick layers (i.e., anything greater than a wavelength of light) do produce the controlled divergence required.

Looking back to Fig. 2 it is noted that the lens 15 and 16 have a finite size entrance pupil. If they were working at pinhole aperture and the surface 31 were of the type shown at 103 in Fig. 10, the spread of the rays 36 would be 6° (or 3° half angle). The pupils are greater than pinhole, however, and hence the light arriving at the screen 31 is a cone of light for each point so that the total divergence of the transmitted beam will be greater than 6°. It works out to be about 8° when the width spread is in terms of the angle at which the intensity falls to 50%. A half angle of 4° represents a spread to 1¼" (one half interocular which is the distance to either eye from the line 37 in Fig. 2) at a distance of 18" from the screen, as discussed previously.

I claim:

1. A stereo viewer for viewing a pair of stereo transparencies in a mount with their centers about 2½ inches apart, comprising means for holding the mount, means for transilluminating the transparencies, an optical system including a pair of substantially identical horizontally juxtaposed objective lenses for receiving light respectively from the transparencies and for forming approximately superimposed enlarged images thereof in an image plane, a light diverging, substantially non-diffusing, screen with a divergence half angle of about 3° located in said image plane and a positive field lens near said plane with a focal length equal to about ½ to ⅔ times the distance of the field lens from the objective lenses.

2. A viewer according to claim 1 in which said translucent screen consists of a transparent sheet with one surface thereof uniformly ground to diffuse light and a transparent layer of refractive index different from that of the sheet by between .02 and .2 coated on the ground surface to a thickness greater than a wavelength of light, to convert the diffusion to slight divergence.

3. A viewer according to claim 1 in which said light diverging screen consists of a transparent sheet of index of refraction N with one surface thereof located in said image plane with conical elements perpendicular to said plane each with a conical half angle approximately equal to C where tan C is between $$\frac{2L}{p}(N-1) \text{ and } 20(N-1)$$

where $p$ is the diameter of the pupil of each lens and $L$ is the optical distance of the plane from said pupil.

4. A viewer according to claim 1 in which the objective lenses magnify to images about 5 inches wide at the image plane, and which includes vertical shields at the sides of the image plane extending approximately perpendicular to the image plane in the direction of the light passing through the image plane, whereby an observer receiving such light will, in order to see the full screen with both eyes, tend to select proper alignment for viewing.

5. A viewer according to claim 1 in which the objective lenses magnify to images between 3 and 10 inches wide at the image plane and which includes vertical shields at the sides of the image plane extending in the direction of the light passing through the image plane, the horizontal vergence of the shields pointing them toward points 5 inches apart at about 2 feet in said direction from the image plane.

6. A viewer according to claim 1 in which the field lens is spaced from the image plane a distance between ¹⁄₂₀ and ½ the distance of the image plane from the objective lenses, the image plane being between the field lens and the objective lenses, whereby said field lens acts partly as a field lens and partly as a magnifying glass relative to the image in the image plane.

7. A stereo viewer for viewing a pair of stereo transparencies in a mount with their centers about 2½ inches apart, comprising means for holding the mount, means for transilluminating the transparencies, a pair of substantially identical horizontally juxtaposed objective lenses for receiving light respectively from the transparencies and for forming approximately superimposed enlarged images thereof in an image plane at an optical distance L from the pupil of each lens, the diameter of said pupil for each lens being $p$, a transparent sheet of index of refraction N with one surface thereof light diverging with a divergence half angle of about 3°, substantially non-diffusing, and located in said image plane with conical elements perpendicular to said plane each with a conical half angle approximately equal to C where tan C is between $$\frac{2L}{p}(N-1) \text{ and } 20(N-1)$$

and a positive field lens near said plane with a focal length equal to about ½ to ⅔ times the distance of the field lens from the objective lenses.

References Cited in the file of this patent

UNITED STATES PATENTS

| | | |
|---|---|---|
| 1,114,232 | Cheron | Oct. 20, 1914 |
| 1,932,029 | Wright | Oct. 24, 1933 |
| 2,391,675 | Brown | Dec. 25, 1945 |
| 2,492,270 | Cornalba | Dec. 27, 1949 |
| 2,589,014 | McLeod | Mar. 11, 1952 |

FOREIGN PATENTS

| | | |
|---|---|---|
| 460,396 | Great Britain | Jan. 27, 1937 |